(12) United States Patent
Winker et al.

(10) Patent No.: US 9,667,182 B2
(45) Date of Patent: May 30, 2017

(54) METHOD FOR CONTROLLING A BRUSHLESS ELECTRIC MOTOR

(71) Applicant: Minebea Co., Ltd., Nagano (JP)

(72) Inventors: Martin Winker, Wurmlingen (DE); Klaus Moosmann, Schramberg (DE)

(73) Assignee: MINEBEA CO., LTD., Miyota-Machi, Kitasaku-Gun, Nagano (JP)

( * ) Notice: Subject to any disclaimer, the term of this patent is extended or adjusted under 35 U.S.C. 154(b) by 396 days.

(21) Appl. No.: 13/857,826

(22) Filed: Apr. 5, 2013

(65) Prior Publication Data

US 2014/0300300 A1 Oct. 9, 2014

(51) Int. Cl.
| | |
|---|---|
| H02P 6/182 | (2016.01) |
| H02P 3/12 | (2006.01) |
| H02P 6/14 | (2016.01) |
| H02P 6/15 | (2016.01) |

(52) U.S. Cl.
CPC . H02P 6/14 (2013.01); H02P 6/15 (2016.02)

(58) Field of Classification Search
USPC .......................................... 318/362, 375, 805
See application file for complete search history.

(56) References Cited

U.S. PATENT DOCUMENTS

| | | | | |
|---|---|---|---|---|
| 3,593,090 A | * | 7/1971 | Kearns ........................... | 318/444 |
| 4,694,210 A | * | 9/1987 | Elliott ................... | H02K 1/2786 |
| | | | | 310/156.16 |
| 5,249,924 A | * | 10/1993 | Brum ..................... | B64D 39/00 |
| | | | | 416/152 |
| 5,361,022 A | * | 11/1994 | Brown ...................... | H02P 3/12 |
| | | | | 318/375 |
| 5,430,362 A | * | 7/1995 | Carr ........................ | F02N 11/04 |
| | | | | 318/139 |
| 5,563,487 A | * | 10/1996 | Davis ............................ | 318/701 |
| 6,078,156 A | * | 6/2000 | Spurr ....................... | H02P 3/08 |
| | | | | 318/368 |
| 6,104,153 A | * | 8/2000 | Codilian ................ | G11B 19/20 |
| | | | | 318/254.2 |
| 6,452,349 B1 | * | 9/2002 | Hahn ....................... | H02P 6/16 |
| | | | | 318/400.22 |
| 7,019,473 B2 | * | 3/2006 | Yang ........................ | H02P 6/10 |
| | | | | 318/400.25 |
| 7,885,785 B1 | * | 2/2011 | Pekarek .................... | H02P 6/16 |
| | | | | 318/400.01 |
| 7,923,951 B2 | * | 4/2011 | Soma .................... | B60L 3/0046 |
| | | | | 180/65.1 |

(Continued)

*Primary Examiner* — Bentsu Ro
*Assistant Examiner* — Cortez Cook
(74) *Attorney, Agent, or Firm* — Grossman, Tucker, Perreault & Pfleger, PLLC.

(57) ABSTRACT

The invention describes a method for controlling a sensorless, brushless DC motor that is controlled via a bridge circuit preferably using pulse width modulation (PWM) having precommutation. According to the invention, in the braking operation each commutation interval is divided into two phases. A drive phase, lasting from the start of the commutation interval up to zero crossing in which the motor is controlled with the normal PWM, and a braking phase, lasting from zero crossing up to the next commutation time in which at least two motor phases are short-circuited and/or in which the PWM is operated with recovered energy. The efficiency of the control circuit is as low as possible so as to ensure that the braking energy is consumed in the control circuit.

11 Claims, 7 Drawing Sheets

(56) References Cited

U.S. PATENT DOCUMENTS

Figure 1:
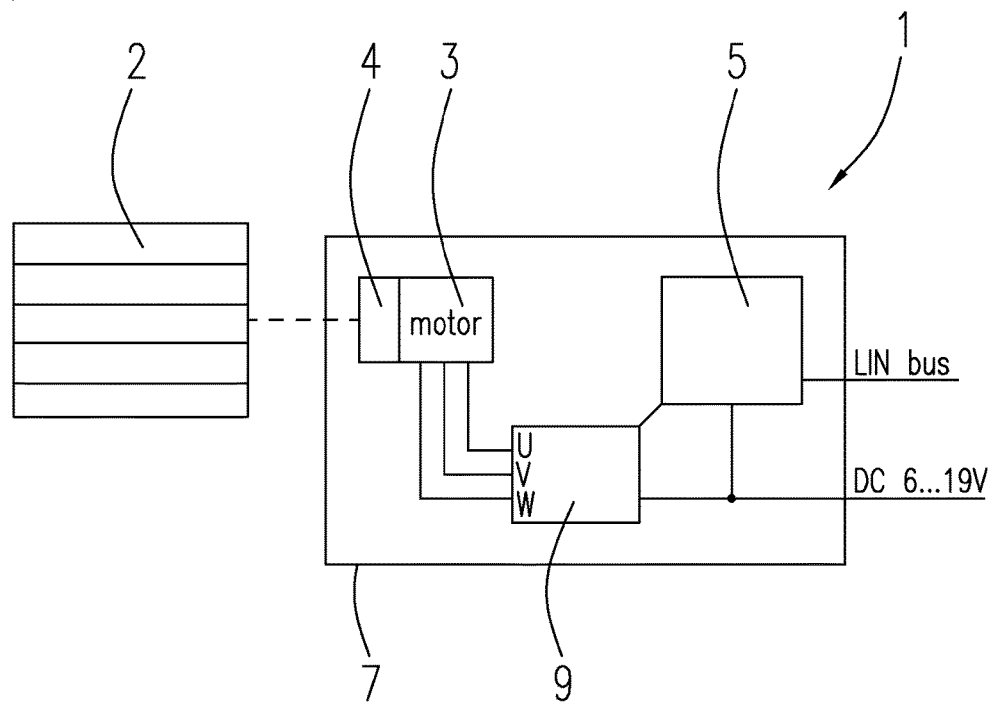

| | | | |
|---|---|---|---|
| 2004/0183490 A1 | 9/2004 | Maeda | |
| 2004/0257018 A1* | 12/2004 | Tobias | B62D 5/0484 318/400.21 |
| 2005/0245182 A1* | 11/2005 | Deshpande | B24B 23/03 451/357 |
| 2006/0076171 A1* | 4/2006 | Donnelly | B60L 7/04 180/65.225 |
| 2006/0091840 A1* | 5/2006 | Weinmann | 318/434 |
| 2009/0009115 A1* | 1/2009 | Grogg | H02P 6/182 318/400.34 |
| 2011/0316456 A1* | 12/2011 | Rottmerhusen | 318/381 |
| 2012/0104988 A1* | 5/2012 | Ramu | H02K 1/24 318/722 |
| 2012/0256575 A1* | 10/2012 | Chien et al. | 318/400.35 |
| 2013/0043814 A1* | 2/2013 | Chuah | H02P 6/18 318/400.04 |

* cited by examiner

METHOD FOR CONTROLLING A BRUSHLESS ELECTRIC MOTOR

FIELD OF THE INVENTION

The invention describes a method for operating a sensorless, brushless electric motor, used particularly for braking the motor.

BACKGROUND OF THE INVENTION

The invention is based on a sensorless, brushless electric motor that is used in a motor vehicle as an actuator for flaps, such as air flaps or spoilers. For this kind of actuator, it is desirable if the electric motor is operated at a constant rotational speed. For this purpose, the electric motor preferably has a control having pulse width modulation (PWM).

Depending on the position of the air flaps, it so happens that the weight that acts on the air flaps reinforces the movement of the motor. In order to achieve a desired rotational speed, a lower motor current is then required.

However, this could also mean that the force of weight alone, without any current, drives the motor above the desired rotational speed. In this case, the motor would have to be actively braked so as to attain the nominal rotational speed. This can be achieved by operating the motor as a generator.

On braking, several measured variables of the motor change their sign and can thus no longer be measured by unsophisticated electronics, for example, which is why the motor can no longer be effectively controlled. The integrated zero crossing identification, which is necessary for sensorless commutation, may also be thereby impaired.

Due to the braking operation, negative phase currents occur, for example, that could entail undesirable disturbances and effects. Additionally, any switching spikes that may occur have to be filtered, which makes the control circuit more complex and expensive.

The negative current cannot be measured by the available current measuring device. In addition, overvoltages may possibly occur in the internal power supply that could cause damage.

Moreover, care must be taken to prevent the braking energy produced in generator mode from being fed back into the vehicle electrical system. Instead, it has to be dissipated which means additional, more complex circuitry has to be provided.

Regulation of the rotational speed in the braking operation is thus only made possible using additional measurement technology that can also process negative currents, which, however, is complex and expensive.

An object of the invention is to create a method for controlling this kind of actuator in which the above-mentioned problems do not occur and which can also be regulated to a nominal speed even during the braking operation.

SUMMARY

The method according to the invention relates to the braking operation, i.e. when the motor is driven faster due to external forces and its rotational speed is higher than the nominal rotational speed, so that active braking is required.

As long as there is no need for braking, the motor is preferably commutated in the normal way, i.e. commutated without sensors according to a known method, where the commutation signal may be additionally superimposed by PWM.

In the braking operation, each commutation interval is divided into two phases. Each commutation interval lasts from one commutation time to the next commutation time. Here, it is irrelevant whether a motor is commutated using Hall sensors or a sensorless commutation method is used. A system having sensorless commutation is described here by way of example since the influences of negative phase currents, for example, on commutation are considerably greater here. A first phase, the drive phase, lasts from the beginning of a commutation interval up to zero crossing of the back electromotive force (BEMF). This BEMF voltage represents a voltage induced by the permanent magnetic rotor that, on rotation of the rotor (i.e. not at a standstill), is present at the stator phases and can be measured in the de-energized phase. Commutation then takes place according to the zero crossings of the BEMF. The type of commutation is of no importance. The motor can preferably be operated with precommutation. This precommutation can be dynamic or have a specified precommutation time.

In the drive phase, the motor is preferably controlled using PWM. Here, the motor current is positive, so that the motor is being driven. In this phase, it is possible to identify the zero crossing of the BEMF voltage, so that commutation information is available at all times. There are no disturbances due to negative currents and current control is active.

The second phase, the braking phase, lasts from zero crossing up to the end of the commutation interval. In this phase, at least two motor phases are actively short-circuited for a short time. The short-circuit causes an abrupt braking of the motor. When the short-circuit is then released, the short-circuit current stored in the inductance of the motor phases is fed back into the power supply. Mechanical energy is hence transformed via the short-circuit and current recovery and is thus dissipated. The switching time for the short-circuit is set such that the resulting short-circuit current in the motor phases is not too high. By repeating this process several times during a braking phase, sufficient mechanical energy can be dissipated. The braking effect can be further increased by short-circuiting all three motor phases. Alternatively, an appropriately configured PWM may be applied intermittently or continuously which runs the motor as a generator. These switch-on and switch-off times of the individual bridges are arranged such that the resulting voltage at the motor phases is lower than the BEMF voltage, which means that the motor current becomes negative and energy is fed back. During the above-mentioned switch-off time, at least two of the three lower switches of the bridge are closed, whereby the motor is momentarily short-circuited and thus an inductor of two of the three phase windings U,V,W is charged with current via the BEMF voltage. After the bridge has been switched over, during switch-on time, the current stored in the relevant phase windings is then made available via the now closed upper switch of the modulated branch of the bridge for driving the motor. Depending on the ratio of the switch-on time to the switch-off time, the resulting motor current will be larger or smaller. For example, whereas at a nominal rotational speed of 2000 rpm and a ratio of 70% switch-on time to 30% switch-off time, a positive motor current of 100 mA occurs, for the inverse ratio of 30% switch-on time to 70% switch-off time, at the same rotational speed, a negative motor current of −10 mA occurs, having the corresponding braking effect. This possibility of reversing the direction of the motor current is fundamental.

This makes it possible to effectually mete out the braking force according to requirements. The recovered energy is generally consumed in the system, for example, by the microcontroller. To ensure that as much recovered energy as possible is consumed, the efficiency of the circuit in braking mode is kept intentionally low. This means that as much braking energy as possible is consumed in the control circuit and at the same time the temperature rise caused by the consumption of braking energy is evenly distributed over as many components as possible. Non-consumed energy is fed back into the power supply or, should this not be possible, causes an increase in the internal supply voltage. This is why it is preferable if the bridge circuit has a capacitor into which excess energy can be fed. This goes to limit the increase in supply voltage until the excess energy is consumed. This means that in each commutation interval, the rotational speed is not only known, but also regulated to the nominal value, since all the information needed for regulating the rotational speed is available in each commutation interval in the drive phase. It is thus possible to keep the motor at a pre-determined nominal rotational speed irrespective of whether the motor is braked or driven by an external load. The control can quickly switch the motor between the braking phase and the drive phase as required, thus keeping the rotational speed constant. Here, it is preferable if the motor operates with the load during the drive phase. The motor may, however, also be designed such that in the braking phase it operates against the load so that the load is braked even more strongly.

In a further development on the invention, the energy stored in the capacitor is used in the drive phase for driving the motor. In this way, the energy in the capacitor is dissipated again in each commutation interval, so that despite lengthy braking no inadmissible, excessive voltages can occur.

SHORT DESCRIPTION OF DRAWINGS

Examples of the invention are described in more detail below on the basis of an embodiment with reference to the enclosed drawings.

Figure 2:
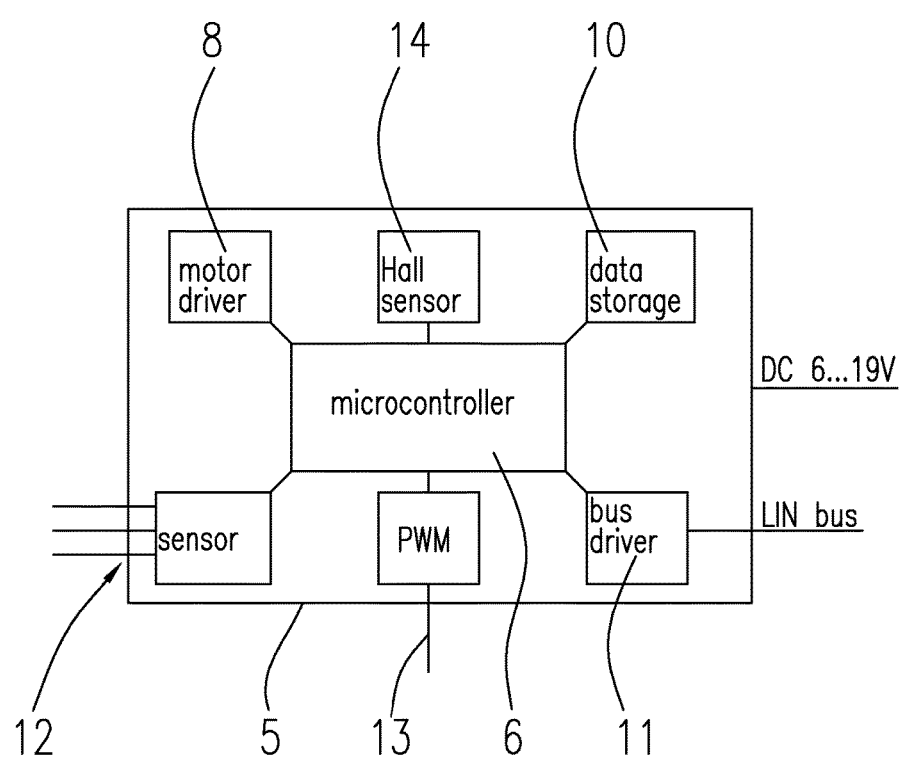
Figure 3:
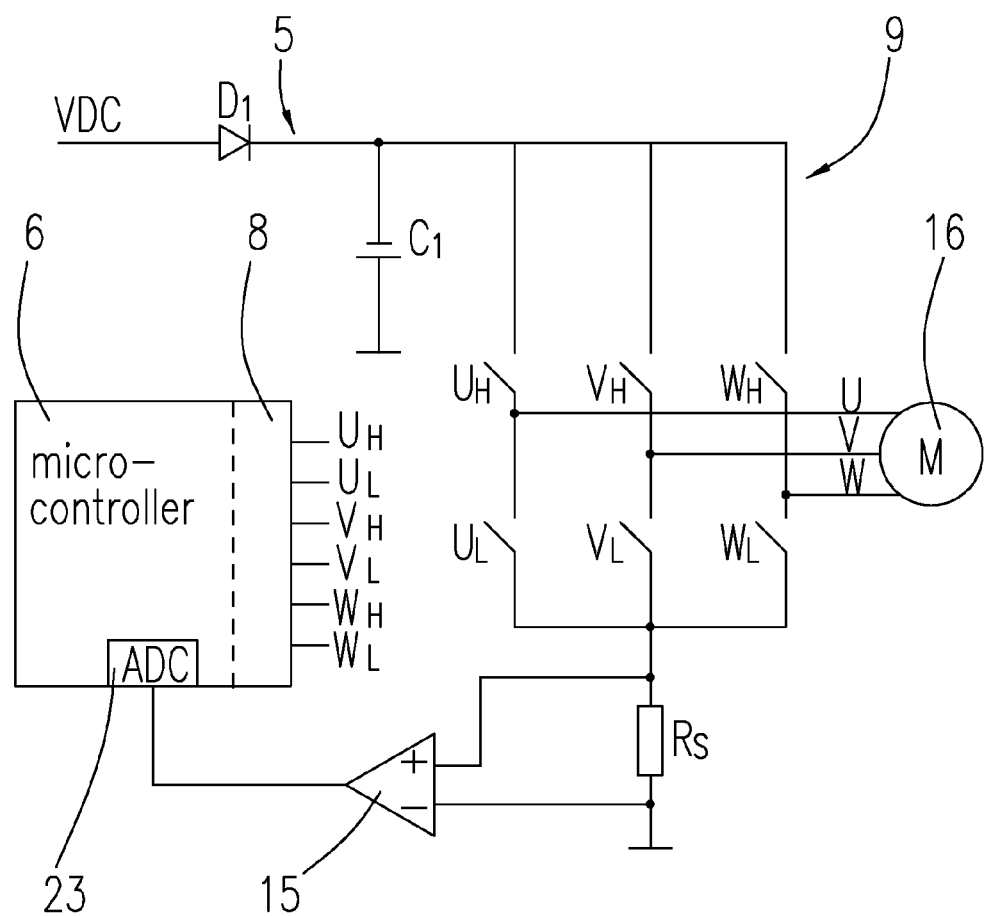
Figure 4:
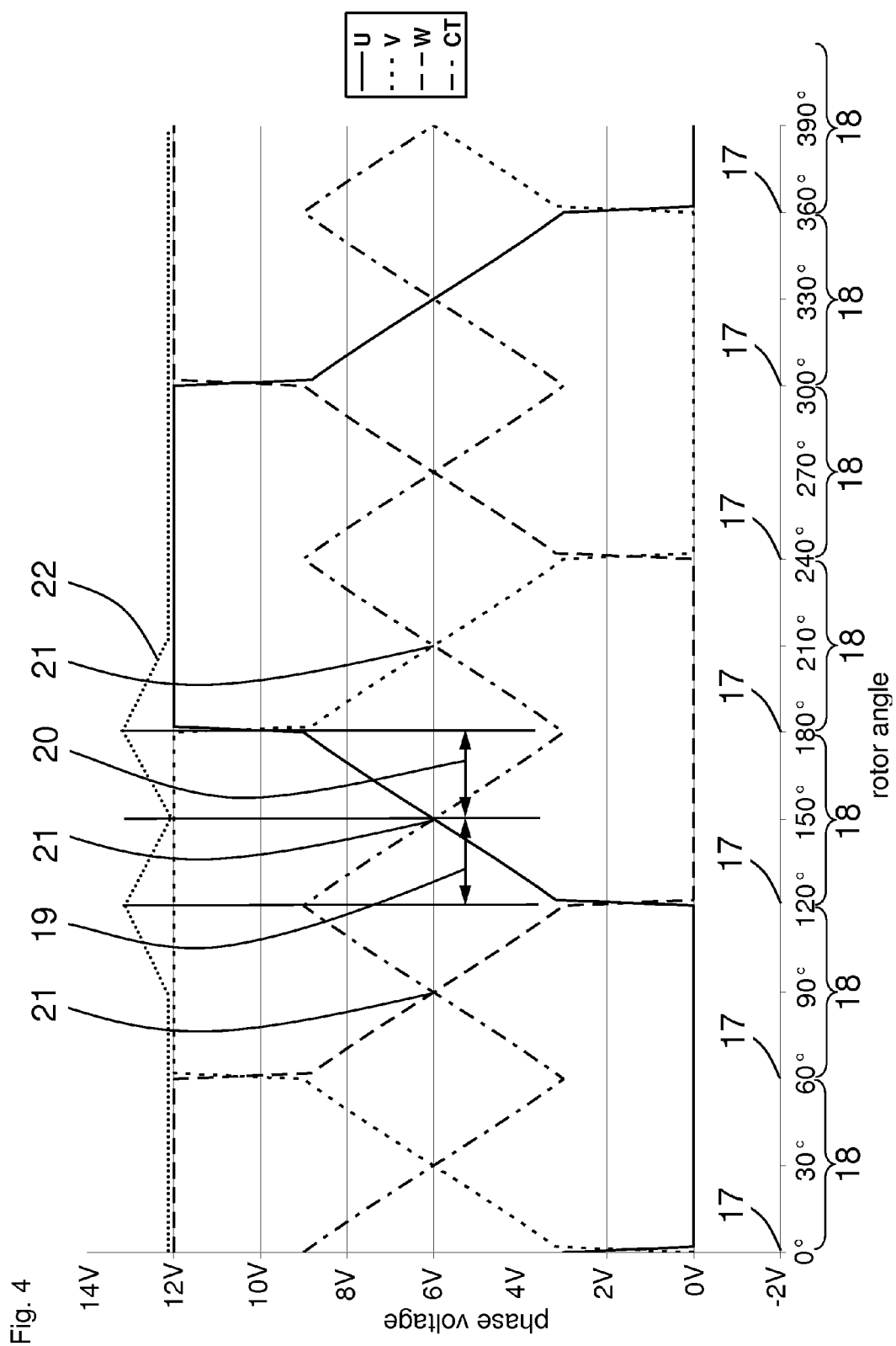

The figures show:

FIG. 1 a schematic view of an actuator for controlling air flaps in a motor vehicle, FIG. 2 a block diagram of a microcontroller according to an example, FIG. 3 a circuit diagram of the bridge circuit and the motor driver as part of the microcontroller and FIG. 4 a commutation diagram, FIG. 5*a*-5*d* a sketch showing the principle of the PWM controlled switching positions during the driving phase and FIG. 6*a*-6*d* a sketch showing the principle of the PWM controlled switching positions during the breaking phase.

DESCRIPTION OF EXAMPLES

Examples of the invention are explained on the basis of an actuator 1 that is used to control air flaps 2 in a motor vehicle (FIG. 1). It is of course clear that the invention is in no way limited to this application and can be used in many other applications without any further changes.

The actuator 1 is a completely integrated solution in which a drive motor 3, a transmission 4 and the control electronics 5 together with a microcontroller 6 are disposed in a water- and dust-proof housing 7. Owing to its application in a motor vehicle, the actuator 1 is subject to a series of requirements that can only be realized by this integrated design.

The drive motor 3 is a brushless DC motor that is controlled via a motor driver 8 having a switching bridge 9. The motor driver 8 forms a part of the microcontroller. The switching bridge 9 is controlled by the microcontroller 6.

The motor has, for example, 6 or 12 magnetic poles and 9 stator slots. The harmonic frequencies in the electromagnetic compatibility (EMC) spectrum are reduced thanks to the distributed geometry.

The microcontroller 6 (FIG. 2) contains the operating program that is needed for controlling the motor. An additional requirement for operation in a motor vehicle is that the microcontroller recognizes and protocols error statuses. The operating program and the error data are stored in the data memory 10 of the microcontroller 6.

The microcontroller 6 is designed such that it can be directly operated at any voltages up to 19 V DC, so that an extra voltage converter is not necessary. The microcontroller 6 is also designed to be operated at temporary voltage peaks of up to 45 V and to handle the voltage impulses standardized in ISO 7637-2, so that for motor vehicle applications it can be operated directly on the vehicle electrical system. Moreover, all components required for operation are integrated in the control circuit, including a LIN interface 11, further interfaces 12, the motor driver 8, ROM, flash memory, EEPROM, PWM interface 13 and digital IO interface. The actuator 1 particularly has a LIN bus interface 11 as used in motor vehicle construction. The control circuit can be configured and any errors displayed via this bus.

The electric motor 3 is controlled without using sensors, with position sensors being the main ones that can be dispensed with. The control circuit 5 preferably has only one single Hall sensor 14 which makes it possible to determine whether the motor 3 is rotating and, moreover, can be used to recognize step losses. For example, for a motor 3 having only one Hall sensor and 6 magnetic rotor poles, a change in the Hall signal takes place every 60 mechanical degrees.

The control circuit of the actuator 1 is disposed on a circuit board such that all components are disposed on one side of the circuit board. In particular, the circuit board is disposed so close to the drive motor 3 that the Hall sensor 14 can likewise be disposed on the circuit board of the control electronics 5. This allows the back of the circuit board to be used as an extra cooling surface and as electrical shielding.

The control electronics 5 have comprehensive control and diagnostic functions. They can independently identify and evaluate electrical failures and deviations from operating parameters, such as under- or overvoltages, temperature, overcurrent as well as deviations in the behavior of the actuator, and then to protect itself where required, and on the command of a bus master to report error situations. For this purpose, it can contain further sensors, or other sensors can be controlled via the interface 12.

For the above-described application in a motor vehicle, it is important that the actuator 1 has a constant rotational speed, irrespective of the load situation of the motor 3.

FIG. 3 shows the bridge circuit 9 for controlling the three motor phases U,V,W. Each motor phase has an upper UH, VH, WH and a lower UL, VL, WL power switch that are controlled by the motor driver 8 in the microcontroller 6. For measuring the current, a series resistor Rs is connected to all motor phases, so that the complete motor current is always measured.

The series resistor Rs is connected via an operational amplifier 15 to an analog/digital converter 23 in the microcontroller 6. This allows the motor current to be regulated via the pulse width modulation PWM of the motor phases.

At the voltage input VDC, a diode D1 is disposed that prevents braking energy from being fed from the motor 3 back into the voltage supply. At the cathode of the diode D1, a capacitor C1 is disposed that takes up and temporarily stores this braking energy.

FIG. 4 shows a commutation diagram with the voltage waveforms of the three motor windings U,V,W with several commutation times 17 and the crossing point of the neutral point CT with the BEMF voltage, also called zero crossing of the BEMF voltage 21, whereby the commutation intervals 18 are also defined. According to the example, each commutation interval 18 is divided in the braking operation into two phases: a drive phase 19 and a braking phase 20.

The drive phase 19 lasts from the commutation time 17 up to zero crossing 21. In the drive phase 19, the motor is driven and the PWM is configured such that the motor current is positive, so that energy is consumed in the motor (FIG. 5). This configuration of the PWM is explained in detail on the basis of the braking phase 20 shown in FIG. 6. Here, FIGS. 5 and 6 show a detail from the bridge circuit illustrated in FIG. 3, where only four of the six power switches that are associated with two of the three phases are shown.

The braking phase 20 lasts from zero crossing 21 up to the commutation time 17. As shown in FIG. 6 on the basis of two switches taking the form of MOSFETs in the upper and in the lower bridge branch, in the braking phase 20, the PWM is adjusted such that the motor current is negative and energy is recovered. This can be achieved in that for at least one or more bridges, the upper and the lower power switches are always alternately activated in such a way that the resulting voltage is thereby lower than the BEMF voltage of the motor, as a result of which ideally a negative phase current is produced and the motor moves into generator mode. The conductive path is shown in each of the FIGS. 5 and 6 by a broken line and an inductor L of two of the three phase windings is explicitly shown. The switch-on and switch-off times of the individual bridges are arranged such that the resulting voltage at the motor phases U,V,W is lower than the BEMF voltage, i.e. the motor current becomes negative and energy is fed back.

During the above-mentioned switch-off time (FIG. 6c), at least two of the three lower switches of the bridge are closed, causing the motor to be momentarily short-circuited and thus the inductor L to be charged with current via the BEMF. After the bridge has been switched over, during switch-on time (FIG. 6a), the current stored in the inductor L is then conducted via the now closed upper switch of the modulated branch of the bridge and, depending on the ratio of the switch-on time (FIG. 6a), during which the motor is energized and thus driven, to the switch-off time (FIG. 6c), during which the motor is operated as a generator, a larger or smaller motor current is produced.

For example, whereas at a nominal rotational speed of 2000 rpm and a ratio of 70% switch-on time to 30% switch-off time, a positive motor current of 100 mA occurs, for the inverse ratio of 30% switch-on time to 70% switch-off time, at the same rotational speed, a negative motor current of −10 mA occurs, having the corresponding braking effect.

Figure 6A:
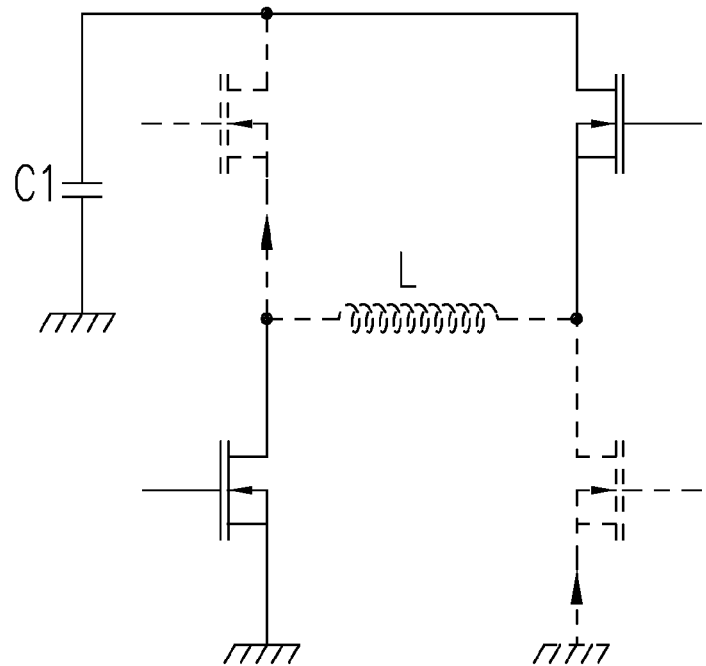
Figure 6B:
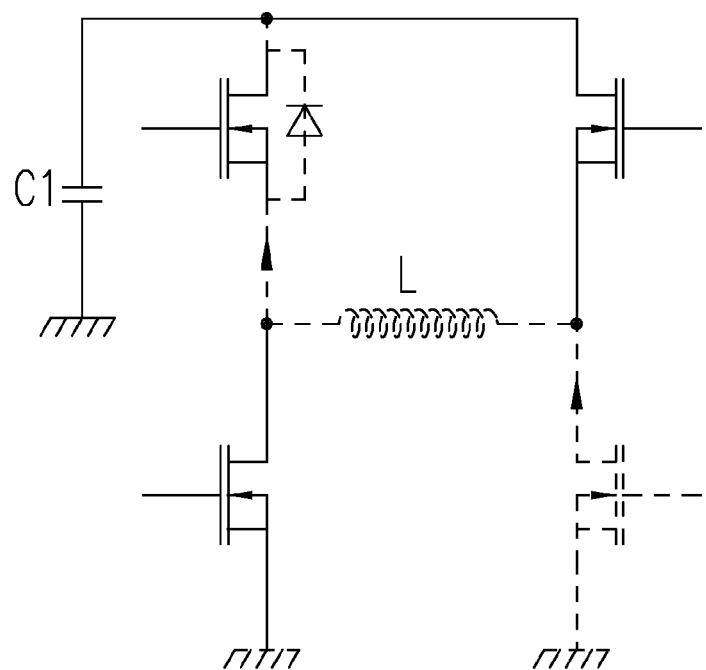
Figure 6C:
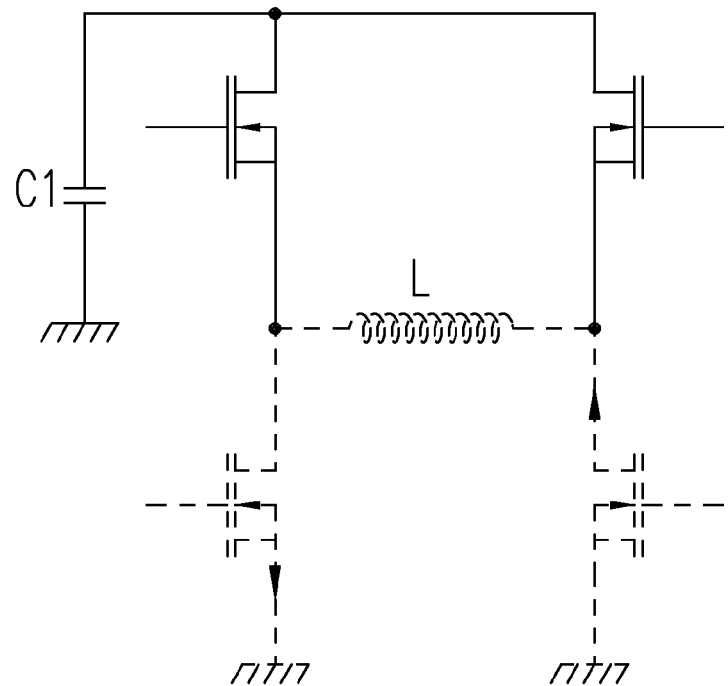
Figure 6D:
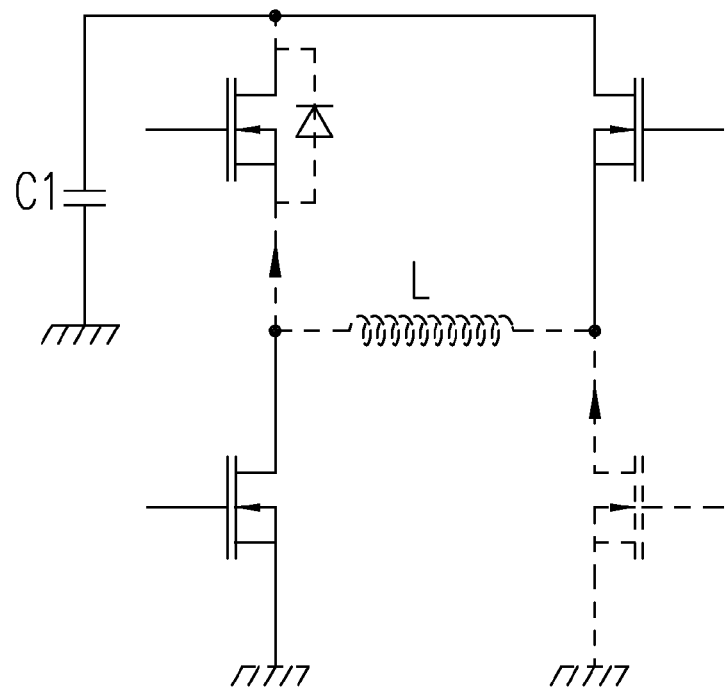

As shown in FIGS. 6c and 6d, on opening one of the previously closed MOSFET switches during this idle time (FIG. 6d), the current continues to flow through the body diodes and in doing so has higher power losses than with a closed MOSFET switch. The same effect during the idle time illustrated in FIG. 6b on switching off a switch after a switch-on time is shown in accordance with FIG. 6a. During these idle times illustrated in FIGS. 6b and 6d, the energy stored in the inductor L of the phase windings can be discharged in the capacitor C1.

Figure 5A:
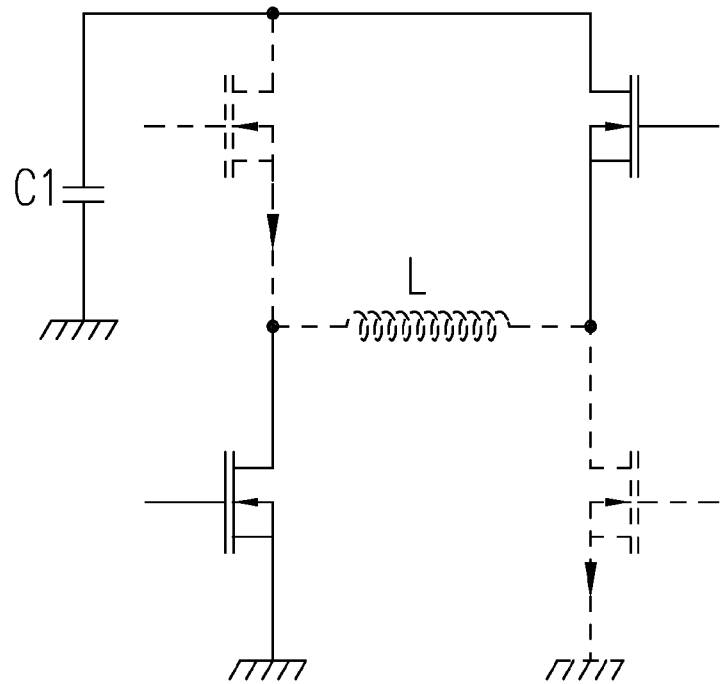
Figure 5B:
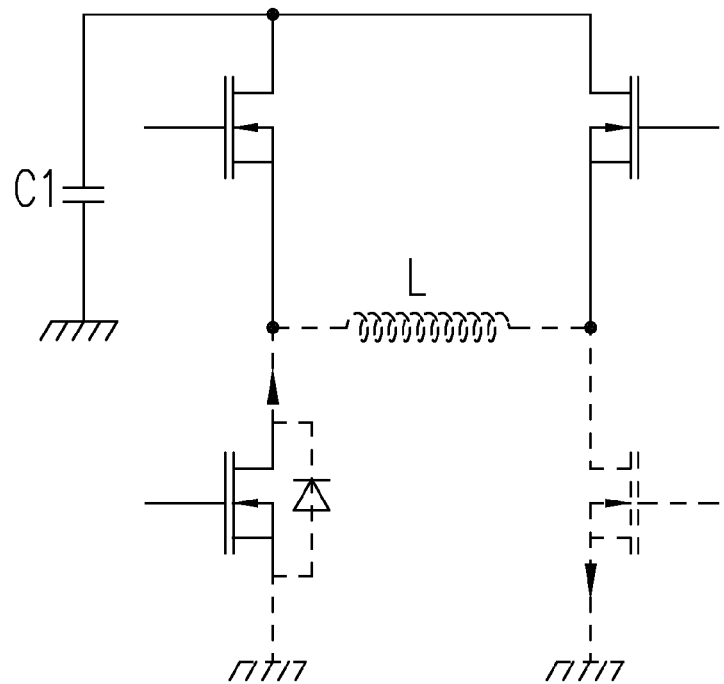
Figure 5C:
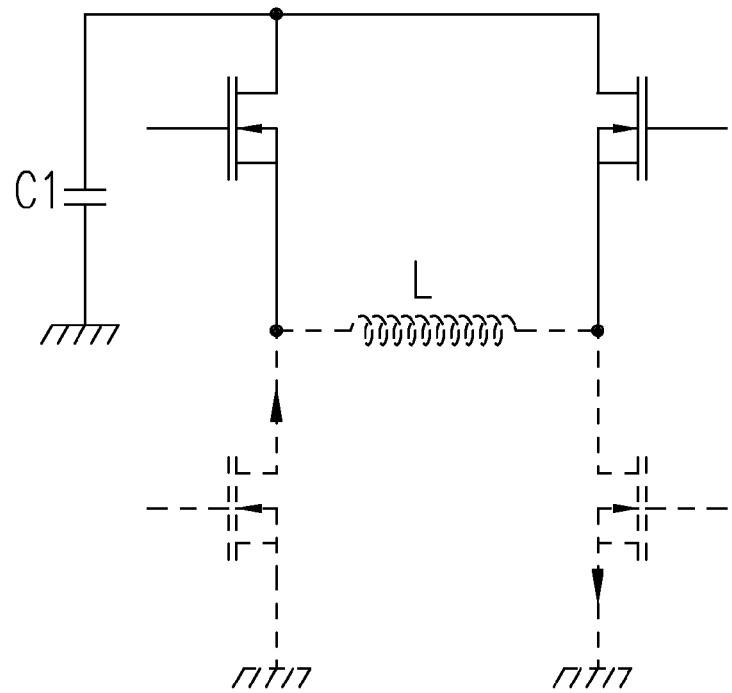
Figure 5D:
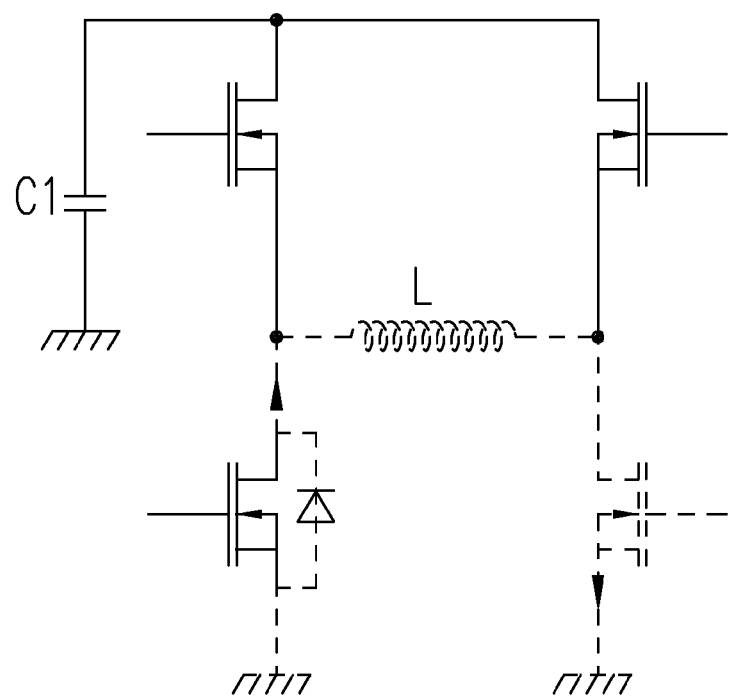

As can be seen in FIGS. 5a to 5d, the motor current during the drive phase is positive, i.e. its direction of flow reversed, so that energy is consumed in the motor. In FIGS. 5b and 5d the idle time is in turn shown in which now, in contrast to the braking phase, the current flows between the upper and lower side of the bridge in the forward direction of the body diodes.

Alternatively, at least two motor windings are specifically short-circuited for a short time, which causes the motor 3 to be braked. This takes place by switching on at least two power switches, such as the lower power switches UL,VL, WL that preferably take the form of MOSFET switches. At the same time, on release of the short-circuit, the motor 3 operates as a generator, with energy being fed back into the system. This braking energy is mainly consumed in the microcontroller 6. In addition, on switching the power switch, the braking current flows through the body diodes of the MOSFET switches, which goes to additionally reduce the efficiency of the circuit and extra energy is consequently consumed.

Due to the diode D1, the excess braking energy cannot be fed back into the supply voltage VDC and is thus stored in the capacitor C1.

During the braking phase 20, the internal voltage 22 in the motor driver 8 thus increases above the supply voltage VDC. This excess energy from the capacitor C1 is consumed again in the drive phase 19 for driving the motor 3, so that the internal voltage 22 again falls to the level of the external voltage supply VDC. This goes to prevent the internal voltage 22 in the capacitor C1 from increasing indefinitely.

Furthermore, the motor in the drive phase 19 is fully subject to all regulatory and control mechanisms that are present in normal operation, i.e. in non-braking operation. Thus, even in the braking operation, the motor can be precisely regulated to the nominal rotational speed.

If the actual rotational speed lies above the nominal rotational speed, this is determined in the drive phase 19. The motor is thus driven with the current provided by the PWM. In the following braking phase 20, the braking effect is made sufficiently strong. This continues until the nominal rotational speed is achieved. If the rotational speed falls below the nominal rotational speed in the braking phase 20, it is then readjusted in the following drive phase or phases 19.

Using the method according to the invention, no additional measuring technology at all is required, with which, for example, negative currents could be measured. Further protective circuits for the overvoltage caused by energy recovery are also not necessary. The electric motor according to the invention having this method is thus significantly more price-effective to produce.

The nominal rotational speed of the electric motor is determined using the current through the phase windings and is preferably regulated through the PWM. Here, the duty cycle of the PWM is, for example, at least 5 percent, so as to provide sufficient time to allow the energy stored in the capacitor to be dissipated during the drive phase. However, PWM is not required for the method according to the invention in all embodiments, which is why the invention is in no way limited to the control of the electric motor using PWM.

Alongside application in a flap actuator as illustrated here, the method according to the invention can be used in any electronically commutated electric motor whatsoever, so that the invention is in no way limited to a flap actuator.

IDENTIFICATION REFERENCE LIST

1 Actuator
2 Air flaps

3 Drive motor
4 Transmission
5 Control electronics
6 Microcontroller
7 Housing
8 Motor driver
9 Bridge circuit
10 Data memory
11 LIN bus interface
12 Sensor interface
13 PWM interface
14 Hall sensor
15 Operational amplifier
17 Commutation time
18 Commutation interval
19 Drive phase
20 Braking phase
21 Zero crossing of the BEMF voltage
22 Internal voltage
VDC Supply voltage
D1 Diode
C1 Capacitor
L Phase inductance
Rs Series resistor
U,V,W Motor phases
UH,VH,WH Upper power switches
UL,VL,WL Lower power switches

What is claimed is:

1. A method for controlling a brushless DC motor over a plurality of commutation intervals using a bridge circuit, the method comprising:
receiving, by a controller, an indication of a zero crossing of a back electromotive force (BEMF) voltage from a sensing circuit, the BEMF voltage being induced in phase windings of the brushless DC motor during each commutation interval of the plurality of commutation intervals;
for each commutation interval of the plurality of commutation intervals, dividing, by the controller, each commutation interval into a drive phase and a braking phase based on the received indication of the zero crossing of the BEMF voltage, wherein the drive phase lasts from a start of each commutation interval up to the zero crossing of the BEMF voltage, and wherein the braking phase lasts from the zero crossing up to a next commutation interval;
determining, by the controller, if an actual rotation per minute (RPM) of the brushless DC motor exceeds a nominal RPM; and
in response to determining that the actual RPM of the brushless DC motor exceeds the nominal RPM, short-circuiting at least two phase windings during at least one braking phase of the plurality of commutation intervals to dissipate mechanical energy in the brushless DC motor.

2. The method for controlling a brushless DC motor according to claim 1, wherein the brushless DC motor is commutated without using sensors.

3. The method according to claim 1, wherein the brushless DC motor is operated using pulse width modulation (PWM).

4. The method according to claim 1, wherein in each braking phase at least two phase windings are charged with current via the BEMF voltage from mechanical energy in the brushless DC motor, the current being induced in part from energy made available from one phase windings by switching on at least two switches on a first side of the bridge circuit, followed by switching off a switch on the first side of the bridge, followed by switching on a switch on a second side of the bridge circuit, the second side being different from the first side.

5. The method according to claim 1, wherein the bridge circuit has MOSFET switches.

6. The method according to claim 1, wherein braking energy is stored in at least one capacitor.

7. The method according to claim 6, wherein the braking energy stored in the capacitor in the braking phase is used in the drive phase for driving the motor.

8. The method according to claim 1, wherein the brushless DC motor has a control circuit having only one single Hall sensor.

9. A brushless electric motor comprising:
a control circuit comprising a bridge circuit and a motor driver for controlling the brushless electric motor over a plurality of commutation intervals;
a controller electrically coupled to the control circuit and configured to:
receive an indication of a zero crossing of a back electromotive force (BEMF) voltage from a sensing circuit, the BEMF voltage being induced in phase windings of the brushless electric motor during each commutation interval of the plurality of commutation intervals;
for each commutation interval of the plurality of commutation intervals, divide each commutation interval into a drive phase and a braking phase based on the received indication of the zero crossing of the BEMF voltage, wherein the drive phase lasts from a start of each commutation interval up to the zero crossing of the BEMF voltage, and the braking phase lasts from the zero crossing up to a next commutation interval;
determine if an actual rotation per minute (RPM) of the brushless electric motor exceeds a nominal RPM; and
in response to determining that the actual RPM of the brushless electric motor exceeds the nominal RPM, send a signal to cause a short circuiting of at least two phase windings during at least one braking phase of the plurality of commutation intervals to dissipate mechanical energy in the brushless electric motor.

10. The brushless electric motor of claim 9, wherein a diode is disposed at a supply voltage input of the control circuit to prevent braking energy from being fed back into a voltage supply, and wherein the control circuit has a capacitor for storing the braking energy dissipated due to short circuiting the at least two phase windings of the brushless electric motor during the braking phase.

11. The brushless electric motor according to claim 9, wherein efficiency of the bridge circuit during each braking phase is kept low such that braking energy is consumed by the control circuit and is thermally distributed about the control circuit in an even manner.

* * * * *